United States Patent
Garmise et al.

(10) Patent No.: US 12,509,461 B2
(45) Date of Patent: Dec. 30, 2025

(54) ENHANCED PERFORMANCE OF AMORPHOUS SOLID AND SOLUBILIZED FORMULATIONS FOR ACHIEVING THERAPEUTIC PLASMA CONCENTRATIONS

(71) Applicant: BRISTOL-MYERS SQUIBB COMPANY, Princeton, NJ (US)

(72) Inventors: Robert J. Garmise, Princeton, NJ (US); Jaquan Kalani Levons, Princeton, NJ (US); Jay Poorna Reddy, Princeton, NJ (US); Kevin J. Stefanski, Princeton, NJ (US); Vrushali M. Waknis, Laguna Niguel, CA (US); Theresa M. Ziemba, Princeton, NJ (US); Ajay Saxena, Bangalore (IN); Srikanth Koravady Sridhar, Bangalore (IN); Gajendra Singh Chowan, Bangalore (IN); Sharmistha Pal, Bangalore (IN); Shabeerali Pattasseri, Bangalore (IN); Roopa Narasimhamurthy, Bangalore (IN); Narayan Swamy Panduranga, Bangalore (IN)

(73) Assignee: BRISTOL-MYERS SQUIBB COMPANY, Princeton, NJ (US)

( * ) Notice: Subject to any disclaimer, the term of this patent is extended or adjusted under 35 U.S.C. 154(b) by 1112 days.

(21) Appl. No.: 17/602,025

(22) PCT Filed: Apr. 10, 2020

(86) PCT No.: PCT/US2020/027677
§ 371 (c)(1),
(2) Date: Oct. 7, 2021

(87) PCT Pub. No.: WO2020/210629
PCT Pub. Date: Oct. 15, 2020

(65) Prior Publication Data
US 2022/0144835 A1    May 12, 2022

Related U.S. Application Data

(60) Provisional application No. 62/832,606, filed on Apr. 11, 2019.

(51) Int. Cl.
*C07D 471/18* (2006.01)
*A61K 9/16* (2006.01)

(52) U.S. Cl.
CPC .......... *C07D 471/18* (2013.01); *A61K 9/1635* (2013.01)

(58) Field of Classification Search
CPC .................. C07D 471/18; A61K 9/1635
See application file for complete search history.

(56) References Cited

U.S. PATENT DOCUMENTS

| | | |
|---|---|---|
| 8,263,128 B2 | 9/2012 | Curatolo et al. |
| 2002/0009494 A1 | 1/2002 | Curatolo et al. |
| 2016/0096839 A1 | 4/2016 | Dilger et al. |
| 2017/0305926 A1 | 10/2017 | Hird et al. |

FOREIGN PATENT DOCUMENTS

| | | |
|---|---|---|
| EA | 202192912 A1 | 5/2023 |
| EA | 202192988 A1 | 6/2023 |
| EP | 3023110 A1 | 5/2016 |
| JP | H11116502 A1 | 4/1999 |
| WO | 2015116886 A1 | 8/2015 |

(Continued)

OTHER PUBLICATIONS

Van Den Mooter et al., Drug Discovery Today, vol. 9(2) (2012).*

(Continued)

*Primary Examiner* — Paul V Ward
(74) *Attorney, Agent, or Firm* — Mintz, Levin, Cohn, Ferris, Glovsky and Popeo, P.C.

(57) ABSTRACT

This invention relates to solid amorphous Compound (I) having the formula (I) and to solid amorphous dispersions comprising Compound (I) and one or more polymers or to solution formulations comprising Compound (I) and one or more co-solvents and surfactants. The formulations exhibit enhanced stability and bioavailability. This invention relates to solid amorphous dispersions comprising Compound (I) having the formula (I) and one or more polymers or to solution formulations comprising Compound (I) and one or more co-solvents and surfactants. The formulations exhibit enhanced stability and bioavailability.

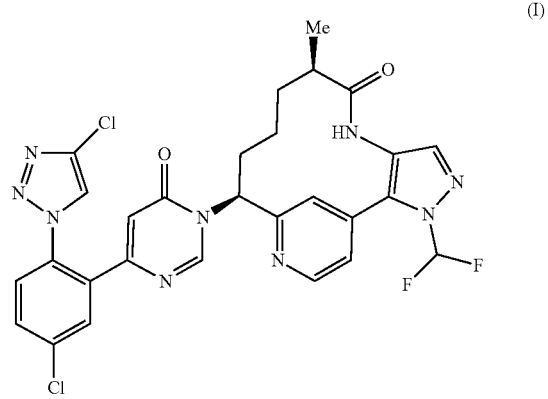

21 Claims, 6 Drawing Sheets

(56) References Cited

FOREIGN PATENT DOCUMENTS

| WO | WO2015/116886 | * | 8/2015 | ........... C07D 471/18 |
| WO | 2015150763 A1 | | 10/2015 | |
| WO | 2016053455 A1 | | 4/2016 | |
| WO | WO2016/053455 | * | 4/2016 | ........... C07D 471/18 |

OTHER PUBLICATIONS

Huang, et al.,: "Fundamental Aspects of Solid Dispersion Technology for Poorly Soluble Drugs", Acta Pharmaceutica Sinica B, 4(1):18-25., Feb. 2014.

Vranic, Edina, "Amorphous Pharmaceutical Solids", Bosnian Journal of Basic Medical Sciences, 4(3):35-39. 2004.

Yu, Lian, "Amorphous Pharmaceutical Solids: Preparation, Characterization and Stabilization", Advanced Drug Delivery Reviews, 48(1):27-42. 2001.

"International Preliminary Report on Patentability for International application No. PCT/US20/27677", mailed on Oct. 21, 2020, 8 pages.

"International Search Report and Written Opinion for International Patent Application No. PCT/US20/27677", mailed on Jun. 15, 2020, 12 pages.

Friesen, et al. (2008) "Hydroxypropyl Methylcellulose Acetate Succinate-Based Spray-Dried Dispersions: An Overview", Molecular Pharmaceutics,5(6):1003-1019.

Guy Van Den Mooter: "The use of amorphous solid dispersions: A formulation strategy to overcome poor solubility and dissolution rate", Drug Discovery Today: Technologies, vol. 9, No. 2, Jun. 1, 2012 (Jun. 1, 2012), Amsterdam, NL, pp. e79-e85, XP055317903, ISSN: 1740-6749, DOI: 10.1016/j.ddtec.2011.10.002.

* cited by examiner

ENHANCED PERFORMANCE OF AMORPHOUS SOLID AND SOLUBILIZED FORMULATIONS FOR ACHIEVING THERAPEUTIC PLASMA CONCENTRATIONS

CROSS-REFERENCE TO RELATED APPLICATIONS

This is application is a continuation of International Patent Application No. PCT/US2020/027677, filed Apr. 10, 2020, which claims priority benefit of U.S. Provisional Application No. 62/832,606 filed Apr. 11, 2019, each of which is incorporated herein by reference in its entirety for all purposes.

FIELD OF THE INVENTION

This invention relates to pharmaceutical formulations containing an inhibitor of Factor XIa (FXIa) and optionally one or more polymers as a solid dispersion or one or more co-solvents, complexing agents and surfactants as a liquid dispersion. More particularly, this invention relates to bioavailable amorphous solid dispersions or solubilized solution dosage forms (e.g., liquid filled capsule) of the inhibitor of FXIa that are stable in the solid or liquid state for extended periods of time.

BACKGROUND OF THE INVENTION

Thromboembolic diseases remain the leading cause of death in developed countries despite the availability of anticoagulants such as warfarin (COUMADIN®), heparin, low molecular weight heparins (LMWH), and synthetic pentasaccharides and antiplatelet agents such as aspirin and clopidogrel (PLAVIX®). The oral anticoagulant warfarin, inhibits the post-translational maturation of coagulation factors VII, IX, X and prothrombin, and has proven effective in both venous and arterial thrombosis. However, its usage is limited due to its narrow therapeutic index, slow onset of therapeutic effect, numerous dietary and drug interactions, and a need for monitoring and dose adjustment. Thus discovering and developing safe and efficacious oral anticoagulants for the prevention and treatment of a wide range of thromboembolic disorders has become increasingly important.

One approach is to inhibit thrombin generation by targeting the inhibition of coagulation FXIa. FXIa is a plasma serine protease involved in the regulation of blood coagulation, which is initiated in vivo by the binding of tissue factor (TF) to factor VII (FVII) to generate factor VIIa (FVIIa). The resulting TF:FVIIa complex activates factor IX (FIX) and factor X (FX) that leads to the production of factor Xa (FXa). The generated FXa catalyzes the transformation of prothrombin into small amounts of thrombin before this pathway is shut down by tissue factor pathway inhibitor (TFPI). The process of coagulation is then further propagated via the feedback activation of Factors V, VIII and XI by catalytic amounts of thrombin. (Gailani, D. et al., *Arterioscler. Thromb. Vasc. Biol.*, 27:2507-2513 (2007).) The resulting burst of thrombin converts fibrinogen to fibrin that polymerizes to form the structural framework of a blood clot, and activates platelets, which are a key cellular component of coagulation (Hoffman, M., *Blood Reviews*, 17:S1-S5 (2003)). Therefore, FXIa plays a key role in propagating this amplification loop and is thus an attractive target for anti-thrombotic therapy.

Recently, inhibitors of FXIa that may be useful in the treatment of thromboembolic disorders have been discovered. One such inhibitor, (9R,13S)-13-{4-[5-chloro-2-(4-chloro-1H-1,2,3-triazol-1-yl)phenyl]-6-oxo-1,6-dihydropy-rimidin-1-yl}-3-(difluoromethyl)-9-methyl-3,4,7,15-tetraazatricyclo[12.3.1.0$^{2,6}$]octadeca-1(18),2(6),4,14,16-pentaen-8-one, has the structure of Formula (I):

and is referred to herein as "Compound (I)". Compound (I), a process to prepare Compound (I), and methods of treatment employing Compound (I) are disclosed in U.S. Patent Application Publication No. 2016/0096839, which is assigned to the present assignee and incorporated herein by reference in its entirety. This compound is non-ionizable in the physiologically relevant region and has low aqueous solubility at room temperature. These characteristics of Compound (I) render it difficult to formulate for oral administration to achieve therapeutically effective blood levels.

Solid dispersion systems of amorphous drug have been investigated with the objective of inhibiting crystal growth and enhancing the dissolution of poorly water soluble drugs. See, e.g., *European Journal of Pharmaceutics and Biopharmaceutics*, 63:103-114 (2006). Generally, it has been found that effective solid amorphous dispersions require the incorporation of at least 20% w/w or higher of polymers (see e.g., WO 10/102245 and US 2003/0219489). In one instance it was reported that 5% w/w of providone (PVP) may inhibit the crystal growth of indomethacin in a molecular dispersion, reportedly via hydrogen bonding of the active ingredient with the PVP polymer. See *Pharmaceutical Research*, 16:1722-1728 (1999). Also, polymer formulations of anti-helmintics have been disclosed that exhibit increased solubility and antihelmintic activity. See EP 0 224 249.

Therefore, what is now needed in the art is one or more bioavailable formulations of Compound (I) that are stable, have a desirable pharmaceutical profile, and are amenable to manufacturing conditions.

It has now been surprisingly found in accordance with the present invention that Compound (I) can be formulated as an amorphous solid dispersion in pharmaceutically relevant polymers such as hydroxypropyl methyl cellulose acetate succinate (HPMCAS) by spray drying. The resultant spray dried solid dispersion (SDD) possesses exceptional physical and chemical stability with high drug load of active pharmaceutical ingredient (API) including 100% amorphous API. The SDD also exhibits unanticipated good stability in moisture rich conditions. No crystallization was observed for three to six months when samples of the formulation were directly exposed to high RH (e.g., 75%). The dissolution behavior of the formulation was robust for all compositions of SDD and was not altered when exposed to stress. Therefore, the drug product maintains performance attributes at all typical storage conditions and it does not require packaging controls such as desiccant and vapor barrier. It has also been surprisingly found in accordance with the present invention that Compound (I) can be solubilized in a solution with comparable therapeutic effectiveness as the SDD formulation.

SUMMARY OF THE INVENTION

In one aspect, the present invention provides Compound (I) of the formula below in an amorphous form.

Figure 1:
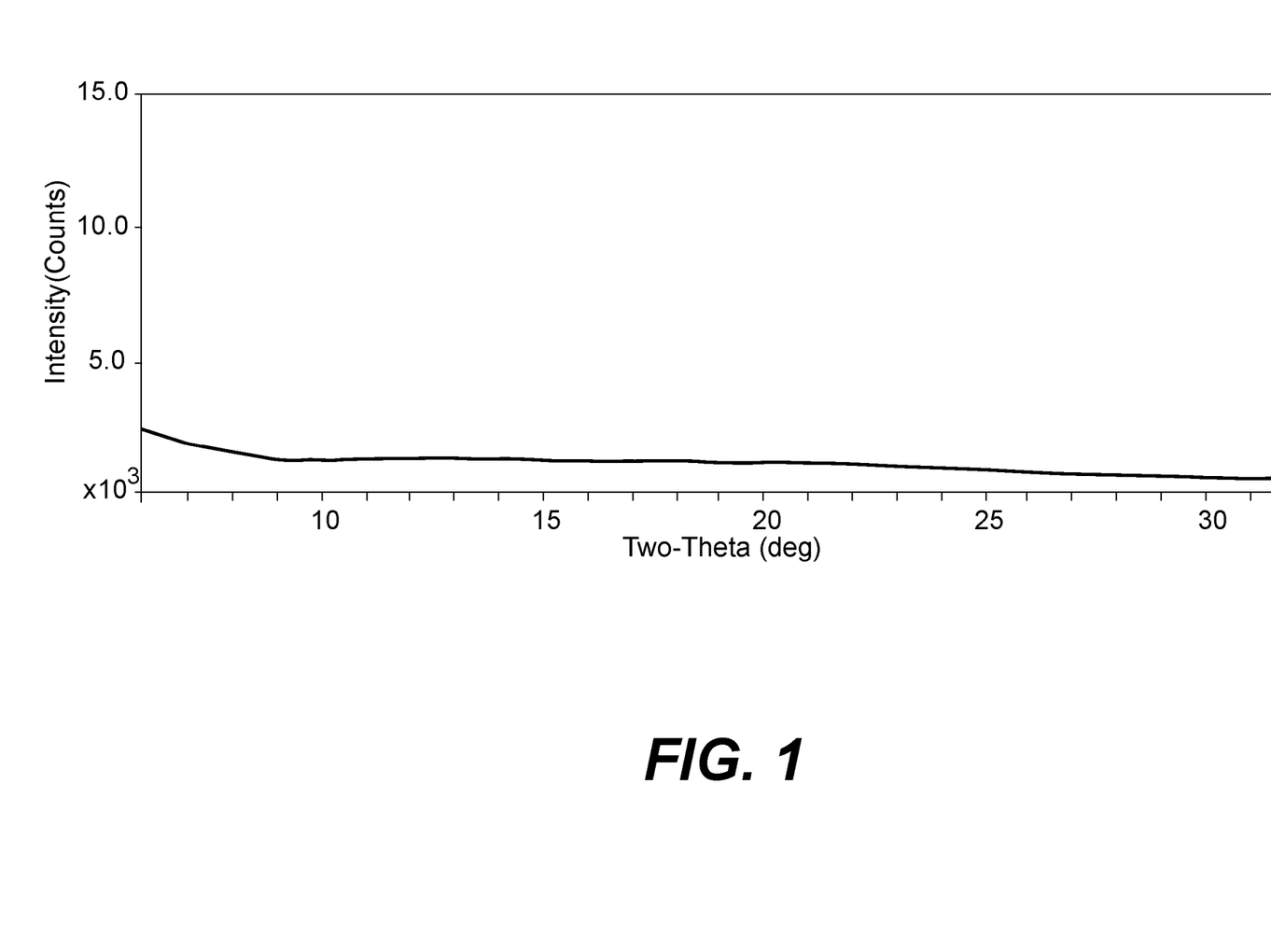
FIG. 1 shows a powder X-ray diffraction pattern of freeze-dried amorphous form of Compound (I).

In another aspect, the present invention provides amorphous Compound (I), which exhibits a powder X-ray diffraction pattern (PXRD) substantially as shown in FIG. 1.

Figure 3:
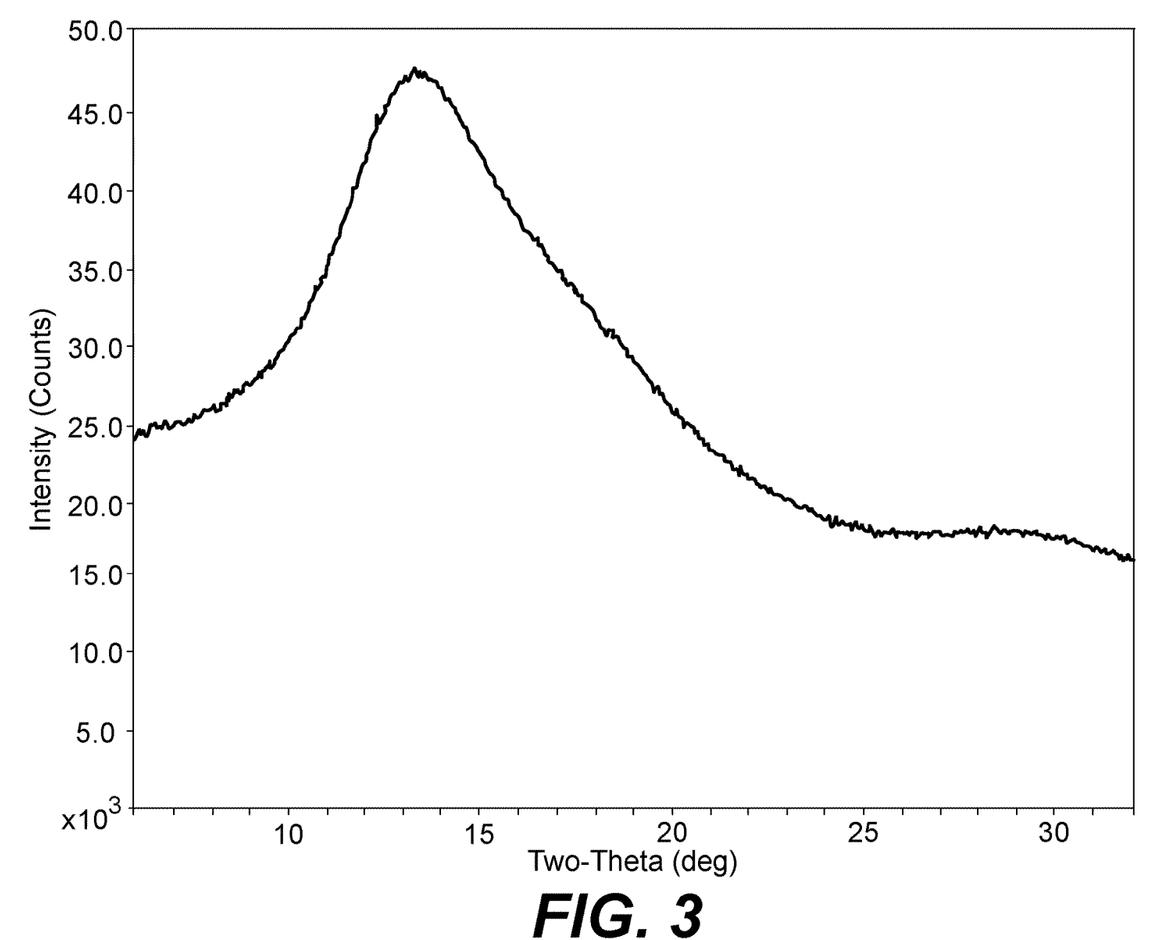
FIG. 3 shows a powder X-ray diffraction pattern of the spray-dried amorphous form of Compound (I).

In another aspect, the present invention provides amorphous Compound (I), which exhibits a powder X-ray diffraction pattern (PXRD) substantially as shown in FIG. 3.

In another aspect, the present invention provides methods of preparing the amorphous form of Compound (I) by freeze drying, spray drying, evaporation lyophilization, melt quenching or extrusion, or any combination thereof. For example, the amorphous form can be prepared by lyophilization. In another example, the amorphous form can be prepared by spray drying.

In another aspect, the present invention provides an amorphous solid dispersion comprising Compound (I) of the formula and a pharmaceutically relevant polymer, wherein said polymer is selected from the group consisting of, but not limited to PVP, HPMCAS, and HPMC.

In another aspect, the present invention provides a method for producing an amorphous solid dispersion of Compound (I), said method comprising:
(a) preparing a liquid solution comprising Compound (I), at least one polymer and a solvent; and
(b) spray drying said liquid solution, thereby producing said amorphous solid dispersion.

The liquid solution can comprise at least one solvent selected from the group consisting of: acetic acid, acetone, dichloromethane, tetrahydrofuran, alcohol (e.g., methanol or ethanol), ethyl acetate, methyl ether ketone, dichloromethane, and water. In some embodiments, the liquid solution can comprise at least one solvent selected from the group consisting of: acetone, tetrahydrofuran, alcohol, ethyl acetate, methyl ether ketone, dichloromethane, and water. In some embodiments, the solvent is dichloromethane and methanol. In some embodiments, the solvent is acetone, dichloromethane, and methanol. For instance, the solvent can be acetone. The polymer can be selected from the group consisting of: PVP, PVP-vinyl acetate copolymer, HPMCAS, and HPMC. For example, the polymer can be HPMCAS.

In another aspect, the present invention provides a pharmaceutical composition comprising a pharmaceutically acceptable carrier and a therapeutically effective amount of the amorphous solid dispersion of the present invention.

In another aspect, the present invention provides a pharmaceutical composition for oral administration.

In another aspect, the pharmaceutical composition formulated for oral administration is in the form of capsules, tablets, pills, powders, granules, or suspensions.

In another aspect, the present invention provides a solution formulation comprising Compound (I) and a co-solvent such as an organic solvent, and optionally a complexing agent, a polymer, a surfactant, or water.

In another aspect, the present invention provides a solution formulation comprising about 1 mg/ml to 10 mg/ml of the active Compound (I), together with up to about 85% (v/v) of a co-solvent, optionally up to about 20% (v/v) of a polymer, optionally up to about 20% (v/v) of a complexing agent, up to about 60% (v/v) of a surfactant, and optionally up to about 10% (v/v) water.

In another aspect, the present invention provides a solution formulation comprising about 1 mg/ml to 10 mg/ml of the active Compound (I), together with up to about 85% (v/v) of polyethylene glycol (PEG) as a co-solvent, optionally up to about 20% (v/v) of PVP K30 as a polymer, and up to about 50% (v/v) of Tween 80 or Vitamin E polyethylene glycol succinate (TPGS) as a surfactant.

In another aspect, the present invention provides a solution formulation comprising about 1 mg/ml to 10 mg/ml of the active Compound (I), together with about 35 to 80% (v/v) of PEG, about 0 to 20% of PVP K30, and about 2 to 50% (v/v) of Tween 80.

In another aspect, the present invention provides a solution formulation comprising about 1 mg/ml to 10 mg/ml of the active compound, together with about 50 to 85% (v/v) of PEG, about 5 to 40% (v/v) of Tween 80.

In another aspect, the present invention provides a solution formulation comprising about 1 mg/ml to 10 mg/ml of the active compound, together with about 80% (v/v) of PEG and about 20% (v/v) of Tween 80.

In another aspect, the present invention provides a pharmaceutical capsule containing the solution or semi-solid formulation. This pharmaceutical capsule is preferably a gel capsule.

In another aspect, the present invention provides a method of making a pharmaceutical composition comprising dissolving Compound (I) in PEG, TPGS, PVP K30, Tween 80, ethanol, or water, or any combination thereof. In some embodiments, the method further comprises the step of adding the composition to a pharmaceutical capsule.

In another aspect, the present invention provides a method for the treatment and prevention of a thromboembolic disorder including, but not limited to, arterial cardiovascular thromboembolic disorders, venous cardiovascular thromboembolic disorders, arterial cerebrovascular thromboembolic disorders, and venous cerebrovascular thromboembolic disorders which comprises administering to a patient a therapeutically effective amount of a pharmaceutical capsule composition according to one or more of the embodiments herein described.

The present invention is directed to these, as well as other important ends, hereinafter described.

DETAILED DESCRIPTION OF THE INVENTION

Definitions

As used herein, "a" or "an" means one or more unless otherwise specified.

As used herein, "amorphous" refers to a solid form of a molecule and/or ion that is not crystalline. An amorphous solid does not display a definitive X-ray diffraction pattern with sharp maxima.

As used herein, "area under the curve" ("AUC") refers to the area under the curve defined by changes in the blood concentration of an active pharmaceutical ingredient, or a metabolite of the active pharmaceutical ingredient, over time following the administration of a dose of the active pharmaceutical ingredient. "$AUC_{0-inf}$" is the area under the concentration-time curve extrapolated to infinity following the administration of a dose. "$AUC_{0-t}$" is the area under the concentration-time curve from time zero to time t following the administration of a dose, wherein t is the last time point with a measurable concentration.

As used herein, "$C_{max}$" refers to the maximum value of blood concentration shown on the curve that represents changes in blood concentrations of an active pharmaceutical ingredient or a metabolite of the active pharmaceutical ingredient, over time.

As used herein, "$t_{max}$" refers to the earliest time at which the blood concentration of an active pharmaceutical ingredient or a metabolite of the active pharmaceutical ingredient is at its maximum value.

As used herein, "bioavailability" refers to the rate and extent to which an active ingredient or active moiety is absorbed from a drug product and becomes available at the site of action. For drug products that are not intended to be absorbed into the bloodstream, bioavailability may be assessed by measurements intended to reflect the rate and extent to which the active ingredient or active moiety becomes available at the site of action. For example, bioavailability can be measured as the amount of active ingredient in the blood (serum or plasma) as a function of time. Pharmacokinetic (PK) parameters such as AUC, $C_{max}$, or $t_{max}$ may be used to measure and assess bioavailability.

As used herein, "dosage" or "dose" refers to any form of the active ingredient formulation that contains an amount sufficient to produce a therapeutic effect with a single administration.

As used herein, "food effect," means a significant difference in the bioavailability of a drug in a patient when the drug is administered in a fasted state compared to a fed state. "No food effect" means that there is no significant difference in the bioavailability of a drug in a patient when the drug is administered in a fasted state compared to a fed state.

As used herein, "formulation" and "composition," which used interchangeably refers to a combination of elements that is presented together for a given purpose. Such terms are well known to those of ordinary skill in the art.

As used herein, "solid dispersion" refers to a system in a solid state including at least two components, wherein one component is dispersed throughout the other component or components. The term "amorphous solid dispersion" as used herein, refers to stable solid dispersions comprising amorphous drug substance and a carrier matrix. An "amorphous drug substance" as used herein, is an amorphous solid dispersion containing drug substance in a substantially amorphous solid state form. A substantially amorphous state may include at least about 80%, at least about 90%, or at least 95% of the drug substance in the dispersion is in an amorphous form.

As used herein, "pharmaceutically acceptable" refers to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

As used herein, "stable compound" and "stable structure" refers to a compound that is sufficiently robust to survive isolation to a useful degree of purity from a reaction mixture, and formulation into an efficacious therapeutic agent. The present invention is intended to embody stable compounds.

As used herein, "treating" or "treatment" covers the treatment of a disease-state in a mammal, particularly in a human, and include: (a) preventing the disease-state from occurring in a mammal, in particular, when such mammal is predisposed to the disease-state but has not yet been diagnosed as having it; (b) inhibiting the disease-state, i.e., arresting it development; and/or (c) relieving the disease-state, i.e., causing regression of the disease state.

As used herein, "include," "including," "contain," "containing," "has," or "having," and the like, mean "comprising."

All numbers expressing quantities of ingredients, weight percentages, temperatures, and so forth that are preceded by the word "about" are to be understood as only approximations so that slight variations above and below the stated number may be used to achieve substantially the same results as the stated number. Accordingly, unless indicated to the contrary, numerical parameters preceded by the word "about" are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

All measurements are subject to experimental error and are within the spirit of the invention.

Abbreviations as used herein, are defined as follows: "1×" for once, "2×" for twice, "3×" for thrice, "° C." for degrees Celsius, "eq" for equivalent or equivalents, "g" for gram or grams, "mg" for milligram or milligrams, "kg" for kilogram or kilograms "L" for liter or liters, "mL" for milliliter or milliliters, "µL" for microliter or microliters, "N" for normal, "M" for molar, "mmol" for millimole or millimoles, "min" for minute or minutes, "h" for hour or hours, "rt" for room temperature, "RT" for retention time, "RBF" for round bottom flask, "atm" for atmosphere, "psi" for pounds per square inch, "conc." for concentrate, "sat" or "sat'd" for saturated, "SFC" for supercritical fluid chromatography "MW" for molecular weight, "mp" for melting point, "ee" for enantiomeric excess, "MS" or "Mass Spec" for mass spectrometry, "ESI" for electrospray ionization mass spectroscopy, "HR" for high resolution, "HRMS" for high resolution mass spectrometry, "LCMS" for liquid chromatography mass spectrometry, "HPLC" for high pressure liquid chromatography, "RP HPLC" for reverse phase HPLC, "NMR" for nuclear magnetic resonance spectroscopy, "Hz" for hertz, and "a", "13", "R", "S", "E", and "Z" are stereochemical designations familiar to one skilled in the art.

Amorphous Solid Dispersion

In one aspect, the present invention provides an amorphous form of compound (I). This novel amorphous form may be characterized by, for example, powder X-ray diffraction.

Figure 2:
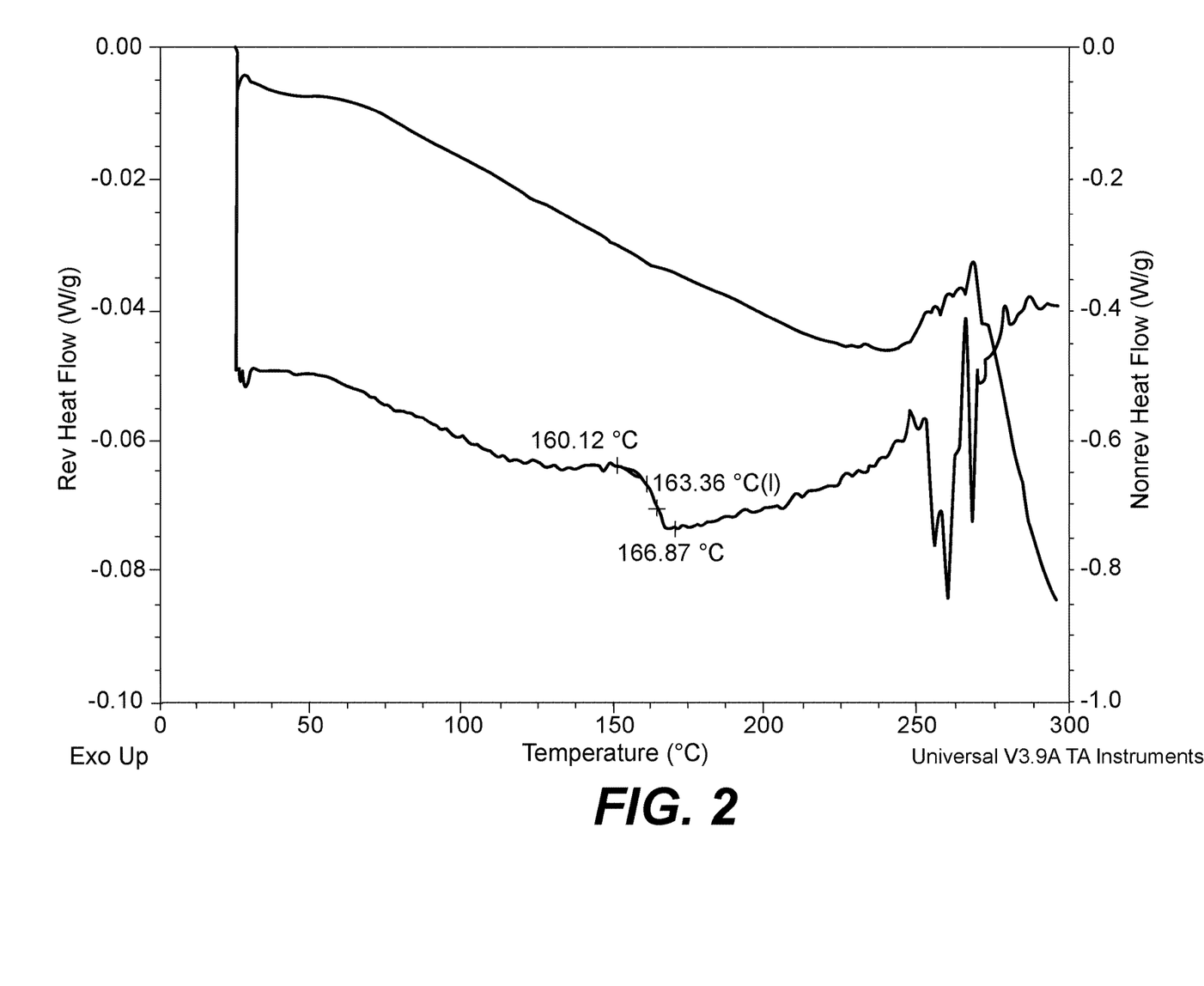
FIG. 2 is a modulated differential scanning calorimetry (DSC) thermogram of the amorphous form of Compound (I).

For example, as shown in FIG. 1, the amorphous form has a powder X-ray diffraction pattern showing no crystalline peaks, indicating an amorphous solid. The amorphous compound as defined above further characterized by at least one of the following characteristics: modulated DSC profile characterized by a glass transition at about 163° C. as shown in FIG. 2.

In one embodiment, the present invention provides processes for preparing the novel amorphous Compound (I). In one embodiment, amorphous Compound (I) was prepared by dissolving Compound (I) in a mixture of acetonitrile-water. The resulted solution was frozen using dry ice and then lyophilized under vacuum. The starting material used for preparing amorphous Compound (I) is preferably crystalline form.

The amorphous Compound (I) as above defined is chemically and physically stable. These properties allow to prepare solid forms containing the compound according to the invention.

In another aspect, the present invention comprises an amorphous solid dispersion composition of Compound (I) of the formula (I)

and a pharmaceutically relevant polymer, wherein the polymer is selected from the group comprising PVP, HPMCAS, and HPMC, etc., particularly HPMCAS. The amorphous solid dispersion of Compound (I) of the present invention has an unexpectedly advantageous pharmaceutical profile. The dispersion exhibits superior oral bioavailability and is surprisingly stable both chemically and physically in the solid state.

In one embodiment, there is provided the amorphous solid dispersion wherein the ratio of Compound (I) to polymer is in the range of from about 99 to about 75% (w/w) Compound (I) and from about 1 to about 25% (w/w) polymer. Unless otherwise stated, percentage (%) of components is provided on a weight/weight or "w/w" basis.

In another embodiment, there is provided the amorphous solid dispersion wherein the ratio of Compound (I) to polymer is in the range of from about 74 to about 50% (w/w) Compound (I) and from about 26 to about 50% (w/w) polymer.

In another embodiment, there is provided the amorphous solid dispersion wherein the ratio of Compound (I) to polymer is in the range of from about 49 to about 25% (w/w) Compound (I) and from about 51 to about 75% (w/w) polymer.

In another embodiment, there is provided the amorphous solid dispersion prepared by lyophilization, or spray-drying methods, particularly by spray-drying.

In another embodiment, there is provided the amorphous solid dispersion that is stable in solid state for at least about 12 months.

In another embodiment, there is provided the amorphous solid dispersion that is stable in solid state for at least about 24 months.

In another embodiment, there is provided a pharmaceutical composition comprised of a pharmaceutically acceptable carrier and a therapeutically effective amount of the dispersion.

In another embodiment, there is provided an orally bioavailable composition comprising the dispersion.

Figure 6:
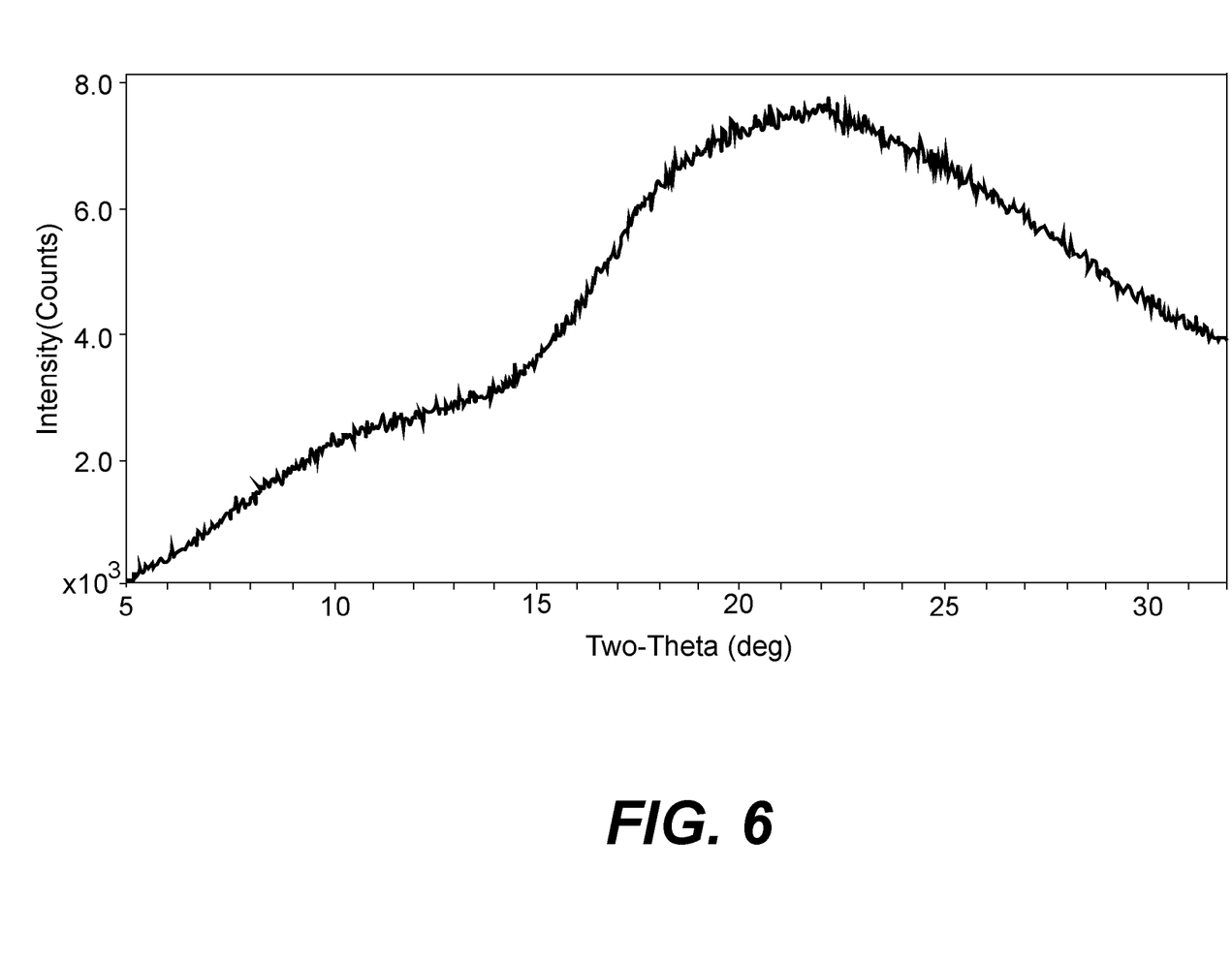
FIG. 6 shows a powder X-ray diffraction pattern of the amorphous solid dispersion composition of Compound (I) and HPMCAS.

In order to prepare the compositions hereinabove described, various preparation means available to the skilled artisan may be utilized. The amorphous dispersions of the present invention may be prepared by lyophilization or spray drying. In some embodiments, the dispersion prepared by a process described herein shows no sign of crystallinity. In order to prepare the compositions described herein it is preferred to utilize spray drying procedures. Spray drying reaction conditions can comprise the use of acetic acid, acetone, dichloromethane, methanol, ethanol, or other organic solvent solutions that optionally include water (0-40% (v/v)). Preferred spray drying reaction conditions comprise the use of acetone, methanol, or ethanol solutions that optionally include water (0-40% (v/v)) with an inlet temperature of the spray dry apparatus of typically about 70-175° C. Temperatures higher than 175° C. are also possible with use of higher water content solvents, e.g., with ethanol. The spray-dried material can have a particle size wherein 90% of the particles are under 100 µm. Typically, the spray-dried material has particle size wherein 90% of the particles are under 50 µm. FIG. 6 confirm the non-crystalline, amorphous nature of the present invention. The dispersions of this invention are surprisingly chemically and physically stable, as illustrated in Example 3. For example, based on the data given in Example 3, it is expected that Compound (I) contained within the dispersion exhibits less than 10% degradation when stored at 25° C./60% RH for at least 12 months.

The compositions of the invention herein described according to the various embodiments may then be tableted using equipment and procedures available in the art. When desired or necessary, suitable additional binders, lubricants, disintegrating agents, and coloring agents can also be incorporated into the tabletting mixture. Suitable binders include starch, gelatin, natural sugars such as glucose or beta-lactose, corn sweeteners, natural and synthetic gums such as acacia, tragacanth or sodium alginate, carboxymethylcellulose, polyethylene glycol, and the like. Lubricants used in these dosage forms include sodium oleate, magnesium stearate, and the like. Disintegrators include, without limitation, starch, methyl cellulose, agar, bentonite, xanthan gum, and the like.

Tablets are formulated, for example, by preparing a powder mixture, granulating or slugging, adding a lubricant and disintegrant, and pressing into tablets. A powder mixture is prepared by mixing the compound, suitable comminuted, with a diluent or base as described above, and optionally, with a binder such as carboxymethylcellulose, an alginate, gelating, or providone, a solution retardant such as paraffin, a resorption accelerator such as a quaternary salt and/or and absorption agent such as bentonite, kaolin, or dicalcium phosphate. The tablet can be with or without a coating. In some embodiments, the tablet formulation is optimized for continuous manufacturing without significant alteration of quality characteristics, e.g., dissolution.

The powder mixture can be granulated by wetting with a binder such as syrup, starch paste, acadia mucilage, or solutions of cellulosic or polymeric materials and forcing through a screen. As an alternative to granulating, the powder mixture can be run through the tablet machine and the result is imperfectly formed slugs broken into granules. The granules can be lubricated to prevent sticking to the tablet forming dies by means of the addition of stearic acid, a stearate salt, talc, or mineral oil. The lubricated mixture is then compressed into tablets.

The compounds of the present invention can also be combined with a free flowing inert carrier and compressed into tablets directly without going through the granulating or slugging steps. A clear or opaque protective coating consisting of a sealing coat of shellac, a coating of sugar or polymeric material, and a polish coating of wax can be provided. Dyestuffs can be added to these coatings to distinguish different unit dosages.

By way of non-limiting example, tablets containing about 1 to about 1000 mg, preferably about 10 to about 500 mg and preferably about 25 to about 200 mg of Compound (I) may be made using the compositions herein described. Other dosage units are within the scope of the invention hereof. In particular, tablets containing spray-dried composition containing Compound (I) and a polymer such as HPMCAS have shown improved in vitro dissolution rates, good in vivo oral bioavailability in dogs and human subjects, and good chemical/physical stability.

The compositions of the invention herein described according to the various embodiments may also be filled in capsules using equipment and procedures available in the art. Capsules are then made by filling formed gelatin sheaths or shells. In addition to gelatin, other materials for the capsule sheath or shell include hydroxypropyl methylcellulose (HPMC), cellulose, methylcellulose, starch, other materials, and combinations of any of the foregoing.

Other methods for preparing capsules (both hard and soft) available to the skilled artisan may also be utilized as described above. Flavoring, preservative, dispersing, and coloring agent can also be present, if desired. Glidants and lubricants such as colloidal silica, talc, magnesium stearate, calcium stearate, or solid polyethylene glycol can be added to the mixture before the filling operation. A disintegrating or solubilizing agent such as agar-agar, calcium carbonate, or sodium carbonate can also be added to improve the availability of the medicament when the capsule is ingested. Moreover, when desired or necessary, suitable additional binders, lubricants, disintegrating agents, and coloring agents can also be incorporated into the mixture. Suitable binders include starch, gelatin, natural sugars such as glucose or beta-lactose, corn sweeteners, natural and synthetic gums such as acacia, tragacanth or sodium alginate, carboxymethylcellulose, polyethylene glycol, and the like. Lubricants used in these dosage forms include sodium oleate, sodium chloride, and the like. Disintegrators include, without limitation, starch, methyl cellulose, agar, betonite, xanthan gum, and the like.

Two-piece capsules may be banded, e.g., with a gelatin-based solution for hard gelatin capsules, or an HPMC-based solution for HPMC capsules.

By way of non-limiting example, capsules containing about 1 to about 1000 mg, preferably about 50 to about 600 mg and preferably about 100 to about 500 mg of Compound (I) may be made using the compositions herein described. Other dosage units are within the scope of the invention hereof.

In particular, capsules containing Compound (I) have demonstrated good in vitro dissolution rates, and also good oral bioavailability in dogs. Even more importantly, the compositions according to the various embodiments of the invention have demonstrated consistent and good bioavailability in humans when delivered orally using the capsule mechanism. This enhanced bioavailability is unexpected based on the presence of significant drug precipitation observed during in vitro studies and a lack of in vitro/in vivo correlation.

The capsule compositions of the invention containing Compound (I) are highly storage stable, demonstrating good long-term chemical and physical stability. This means that they exhibit little (less than about 5%) degradation for at least about 12 months, and preferably for at least about 24 months, when stored in a closed container under either approximately 25° C./60% relative humidity, or at approximately 30° C./65% relative humidity as well.

Accordingly, the present invention provides a method of inhibiting FXIa activity in a patient comprises administering to the patient a therapeutically effective amount of a pharmaceutical tablet or capsule according to one or more of the embodiments hereinabove described.

The pharmaceutical composition of Compound (I) in the form of a tablet or a capsule is expected to be storage stable for an extended period of time. In some embodiments, the tablet and capsule are storage stable for at least about 3 months. In some embodiments, the tablet and capsule are storage stable for at least about 6 months. In some embodiments, the tablet and capsule are storage stable for at least about 12 months. In some embodiments, the tablet and capsule are storage stable for at least about 24 months.

The pharmaceutical composition of Compound (I) can be in the form of a suspension. In some embodiments, the suspension effects, in vivo, a maximal observed blood drug concentration ($C_{max}$) that is higher by a factor of at least 70 relative to a control composition comprising an equivalent quantity of the undispersed drug. In some embodiments, the suspension effects, in vivo, a maximal observed blood drug concentration ($C_{max}$) that is higher by a factor of at least 80 relative to a control composition comprising an equivalent quantity of the undispersed drug. In some embodiments, the suspension effects, in vivo, a maximal observed blood drug concentration ($C_{max}$) that is higher by a factor of at least 110 relative to a control composition comprising an equivalent quantity of the undispersed drug. In some embodiments, the suspension effects, in vivo, an AUC that is higher by a factor of at least 85 relative to a control composition comprising an equivalent quantity of the undispersed drug. In some embodiments, the suspension effects, in vivo, an AUC that is higher by a factor of at least 140 relative to a control composition comprising an equivalent quantity of the undispersed drug. The undispersed drug can be crystalline Compound (I).

Solution Formulation

In another aspect, the present invention provides a solution formulation comprising Compound (I) and a co-solvent such as an organic solvent, and optionally a complexing agent, a polymer, a surfactant, or water.

The co-solvent may include, but is not limited to, polar compounds that contain one or more hydroxyl groups or other polar groups. For example, it includes an alcohol, such as ethanol, preferably ethanol anhydrous, isopropanol; a glycol such as propylene glycol, polyethylene glycol (PEG 400), polypropylene glycol or glycerol; a glycol ether; and a polyoxyethylene alcohol; a tocopherol compound, particularly tocopherol-polyethylene glycol, more particularly a tocopherol polyethylene glycol diacid (such as succinates, maleates, etc.) ester, especially tocopherol polyethyleneglycol succinate, most preferably tocopherol polyethylene glycol 1000 succinate (TPGS 1000).

The complexing agent includes, but is not limited to, water soluble unsubstituted or substituted α-cyclodextrin (αCD), β-cyclodextrin (βCD), and γ-cyclodextrin (γCD). Examples of substituted β-cyclodextrins that may be employed herein include methyl β-cyclodextrin (MβCD), hydroxypropyl beta-cyclodextrin (HPβCD), and sulfobutylether-β-cyclodextrin (SBEβCD). Examples of substituted gamma-cyclodextrins include hydroxypropyl gamma-cyclodextrin (HPGCD). Mixtures of cyclodextrins may also be employed. In one preferred embodiment, the cyclodextrin is hydroxypropyl-β-cyclodextrin (HPβCD).

The polymer component of the formulation is one member selected from the group consisting of polyvinyl alcohol, methyl cellulose, hydroxypropyl cellulose, hydroxypropylmethyl cellulose, polyvinylpryrrolidone (PVP), especially PVP K30, and copovidone (PVP-Polyvinyl acetate), Pluronic F108, Pluronic F127, Pluronic F68, and combinations thereof.

It is preferred that Tween 80 is the preferred surfactant for the active compound. Other surfactants, which may be used in the present invention, include, but are limited to, Cremophor EL, Cremophor RH40, Etocas 40, Croduret 60, and Solutol HS 15.

In another embodiment, the present invention provides a solution formulation comprising about 1 mg/ml to 10 mg/ml of the active Compound (I), together with up to about 85% (v/v) of a co-solvent, optionally up to about 20% (v/v) of a polymer, optionally up to about 20% (v/v) of a complexing agent, up to about 60% (v/v) of a surfactant, and optionally up to about 10% (v/v) water. For example, the co-solvent can be selected from alcohol, PEG, PG, and TPGS. In certain cases, the co-solvent is PEG 400. The complexing agent can be α-cyclodextrin, β-cyclodextrin and γ-cyclodextrin. For instance, the complexing agent can be hydroxypropyl beta-cyclodextrin (HPβCD) and sulfobutylether-β-cyclodextrin (SBEβCD). The surfactant can be selected from Tween 20, Tween 80, Solutol HS 15, Cremophor EL, Cremophor RH40, Etocas 40, and Croduret 60. For example, the surfactant can be Tween 80. The polymer can be selected from PVP K30, Pluronic F108, Pluronic F127, and Pluronic F68.

In another embodiment, the solution formulation comprises about 1 mg/ml to 10 mg/ml of the active Compound (I), up to about 85% (v/v) of PEG, optionally up to about 20% (v/v) of PVP K30, and up to about 50% (v/v) of Tween 80 or TPGS. For instance, the solution formulation can comprise about 1 mg/ml to 10 mg/ml of the active Compound (I), about 35 to 85% (v/v) of PEG, about 0 to 20% of PVP K30, and about 2 to 50% (v/v) of Tween 80. In another example, the solution formulation comprises about 1 mg/ml to 10 mg/ml of Compound (I), about 50 to 85% (v/v) of PEG, about 5 to 40% (v/v) of Tween 80. For instance, the solution formulation can comprise about 1 mg/ml to 10 mg/ml of the active Compound (I), about 80% (v/v) of PEG 400 and 20% (v/v) of Tween 80. In such cases, the active Compound (I) can be solubilized in said PEG 400 and said Tween 80.

In another embodiment, the present invention provides a solution formulation comprising about 1 mg/ml to 10 mg/ml of the active Compound (I), together with up to about 80% (v/v) of polyethylene glycol (PEG) as a co-solvent, optionally up to about 20% (v/v) of PVP K30 as a polymer, and up to about 20% (v/v) of Tween 80 or Vitamin E polyethylene glycol succinate (TPGS) as a surfactant.

In another embodiment, the present invention provides a solution formulation comprising about 1 mg/ml to 10 mg/ml of the active Compound (I), together with about 35 to 80% (v/v) of PEG, about 0 to 20% of PVP K30, and about 2 to 50% (v/v) of Tween 80.

Preferably, there is provided a formulation containing about 1 mg/ml to 10 mg/ml of the active Compound (I), together with about 35 to 80% (v/v) of PEG, about 0 to 20% of PVP K30, and about 2 to 60% (v/v) of Tween 80. More preferably, there is provided a formulation containing about 1 mg/ml to 10 mg/ml of the active compound, together with about 50 to 85% (v/v) of PEG, about 5 to 40% of Tween 80. Even more preferably, there is provided a formulation containing about 1 mg/ml to 10 mg/ml of the active compound, together with about 80% of PEG, about 20% of Tween 80.

Other excipients such as pharmaceutical-grade fillers and binders available in the art may also be incorporated therein the composition, but this is optional. The formulations may optionally also contain a pharmaceutically acceptable antioxidant for stabilization of the dosage form. Examples include ascorbic acid, BHA, BHT, propyl gallate, Vitamin E, and the like.

In order to prepare the compositions hereinabove described, various preparation means available to the skilled artisan may be utilized. It is preferred that Compound (I) be dissolved at elevated temperature in an admixture solution of the polyethylene glycol (PEG) and Tween 80 using apparatus and procedures available in the art.

The liquid formulation of the invention herein described according to the various embodiments may then be further adapted for oral administration in discrete units such as capsules. These capsules may be hard or soft. For instance, for oral administration in the form of a capsule, the compositions herein described containing the active drug component may be utilized as is, or can be further combined with an oral, non-toxic pharmaceutically acceptable inert carrier such as ethanol, glycerol, glycerin, water, and the like. The compositions of the invention may be encapsulated as liquid or semi-solid.

The present invention provides methods of inhibiting FXIa activity in a patient comprises administering to the patient a therapeutically effective amount of the solid and liquid formulations according to one or more of the embodiments hereinabove described. The term "therapeutically effective amount" means the total amount of the active component of the method that is sufficient to show a patient benefit, i.e., symptomatic or disease modifying treatment. When applied to an individual active ingredient, administered alone, the term refers to that ingredient alone. When applied to a combination, the term refers to combined amounts of the active ingredients that result in the therapeutic effect, whether administered in combination, serially or simultaneously.

In another aspect, the present invention is directed to a method for the treatment and/or prophylaxis of a thromboembolic disorder comprising administering to a patient in need thereof a therapeutically effective amount of an amorphous solid dispersion of Compound (I) as described herein.

In another aspect, the present invention is directed to a method for the treatment and/or prophylaxis of a thromboembolic disorder comprising administering to a patient in need thereof a therapeutically effective amount of a solution formulation of Compound (I) as described herein.

In some embodiments, the thromboembolic disorder is selected from unstable angina, an acute coronary syndrome, atrial fibrillation, myocardial infarction, transient ischemic attack, stroke, atherosclerosis, peripheral occlusive arterial disease, venous thrombosis, deep vein thrombosis, thrombophlebitis, arterial embolism, coronary arterial thrombosis, cerebral arterial thrombosis, cerebral embolism, kidney embolism, pulmonary embolism, and thrombosis resulting from medical implants, devices, or procedures in which blood is exposed to an artificial surface that promotes thrombosis.

In another embodiment, the present invention is directed to i) a method for treating disorders, comprising administering to a patient in need thereof a therapeutically effective amount of an amorphous solid dispersion formulation containing compound (I); ii) use of an amorphous solid dispersion of Compound (I) for use in treating a disorder; or iii) use of an amorphous solid dispersion formulation of Compound (I) in the preparation of a medicament for the treatment of a disorder, or iv) use of a solubilized solution dosage form of Compound (I) in the preparation of a medicament for the treatment of a disorder, wherein said disorder is selected from unstable angina, an acute coronary syndrome, atrial fibrillation, first myocardial infarction, recurrent myocardial infarction, ischemic sudden death, transient ischemic attack, stroke, atherosclerosis, peripheral occlusive arterial disease, venous thrombosis, deep vein thrombosis, thrombophlebitis, arterial embolism, coronary arterial thrombosis, cerebral arterial thrombosis, cerebral embolism, kidney embolism, pulmonary embolism, and thrombosis resulting from medical implants, devices, or procedures in which blood is exposed to an artificial surface that promotes thrombosis.

This invention also encompasses all combinations of alternative aspects of the invention noted herein. It is understood that any and all embodiments of the present invention may be taken in conjunction with any other embodiment to describe additional embodiments of the present invention. Furthermore, any elements of an embodiment may be combined with any and all other elements from any of the embodiments to describe additional embodiments.

The foregoing description is merely illustrative and should not be understood to limit the scope or underlying principles of the invention in any way. Indeed, various modifications of the invention, in addition to those shown and described herein, will become apparent to those skilled in the art from the following examples and the foregoing description. Such modifications are also intended to fall within the scope of the appended claims.

General Procedures

Powder X-Ray Diffraction (PXRD)

PXRD data were collected using Bruker D8 Advance powder X-ray diffractometer in theta/theta configuration and equipped with LynxEye™ detector in PSD mode with 3° detector opening. The radiation was Cu Kα (40 kV, 40 mA). X-ray optics included a motorized divergence slit of 0.3°. Sample was placed in top loading zero background holder and rotated at 15 rpm during data collection. Diffraction data were collected over a 2θ range of 2 to 32° in locked coupled scan mode with step size of 0.03° and a counting time of 1 sec/step.

PXRD data were collected using Bruker D4 Endeavor powder X-ray diffractometer equipped with LynxEye™ detector in PSD mode with 3° detector opening. The radiation was Cu Kα (40 kV, 40 mA). X-ray optics included a 0.6° divergence slit and a Ni—$K_\beta$ filter. Data were collected in reflectance geometry, with sample spinning, over a 2θ range of 4 to 32° with a step size of 0.03° and counting time of 1 sec/step in continuous mode.

Modulated Differential Scanning calorimetry (mDSC)

TA INSTRUMENT® model Q2000, Q1000, or 2920 was used to generate mDSC data. Sample size of about 2 to 10 mg was placed in crimped aluminum pan for measurement. The measurement was made at a heating rate of 2 or 2.5° C./min with a modulation amplitude of 0.32 or 1.5° C. applied every 60 seconds in a nitrogen environment from room temperature to 300° C. The DSC plot was made with the endothermic peaks pointing down.

Solid-State Nuclear Magnetic Resonance (SSNMR)

Carbon cross polarization magic angle spinning (CP-MAS) solid state NMR experiments were conducted on a Bruker AV III instrument operating at a proton frequency of 400.13 MHz. Solid samples were spun at 13 KHz in a 4 mm ZrO$_2$ rotor. The contact time was 1.5 to 3 milliseconds and was ramped on the proton channel from 50 to 100% (A. E. Bennett et al, *J. Chem. Phys.*, 1995, 103, 6951), (G. Metz, X. Wu and S. O. Smith, *J. Magn. Reson.* A., 1994, 110, 219-227). The relaxation delay was maintained at 5× $^1$H T$_1$ of API (typically 30 seconds). Proton decoupling was applied using a TPPM sequence with a 2.8 microsecond pulse (90 KHz nominal band width). The spectral sweep width was 300 ppm centered at 100 ppm. 2972 data points were acquired (giving a digital resolution of 20 Hz) and zero filled to 8192 prior to apodization with 20 Hz line broadening. Typically 1024 to 4096 free induction decays were co-added. The spectra were referenced indirectly to TMS using 3-methylglutaric acid (D. Barich, E. Gorman, M. Zell, and E. Munson, *Solid State Nuc. Mag. Res.*, 2006, 30, 125-129). Approximately 70 mg of sample was used for each experiment. The temperature was set to 280K.

EXAMPLES

Example 1

Preparation of Amorphous Compound (I) by Freeze Drying 30 mg of Compound (I) free form was dissolved in 2 ml of acetonitrile-water (9:1 v/v) mixture. The resulted solution was frozen using dry ice and then lyophilized using ModulyoD 5L freeze dryer from Thermo Scientific at −40° C. under 2-6 mBar vacuum for 16 hrs. Powder X-ray diffraction pattern (FIG. 1) shows no observable crystalline peaks, thus indicating an amorphous solid. The freeze dried amorphous form of Compound (I) was also characterized by modulated differential scanning calorimetry (mDSC) and shown in FIG. 2.

Example 2

Preparation of Amorphous Compound (I) by Spray Drying

An acetone-water (9:1 w/w) solution of Compound (I) free form with 1.6% (w/w) solid loading was spray dried using Bend Lab Spray Dryer (Bend Research Inc.) The following operating parameters and conditions were applied.

| | |
|---|---|
| Atomizer | Schlick 2.0 |
| Atomizer Pressure (psi) | 125 |
| Gas Flow rate (g/min) | 450 |
| Feed Rate (g/min) | 28 |
| Inlet Temperature (° C.) | 91 |
| Outlet Temperature (° C.) | 42 |
| Secondary Drying | 40° C., 15% RH, 20 hr |

Figure 4:
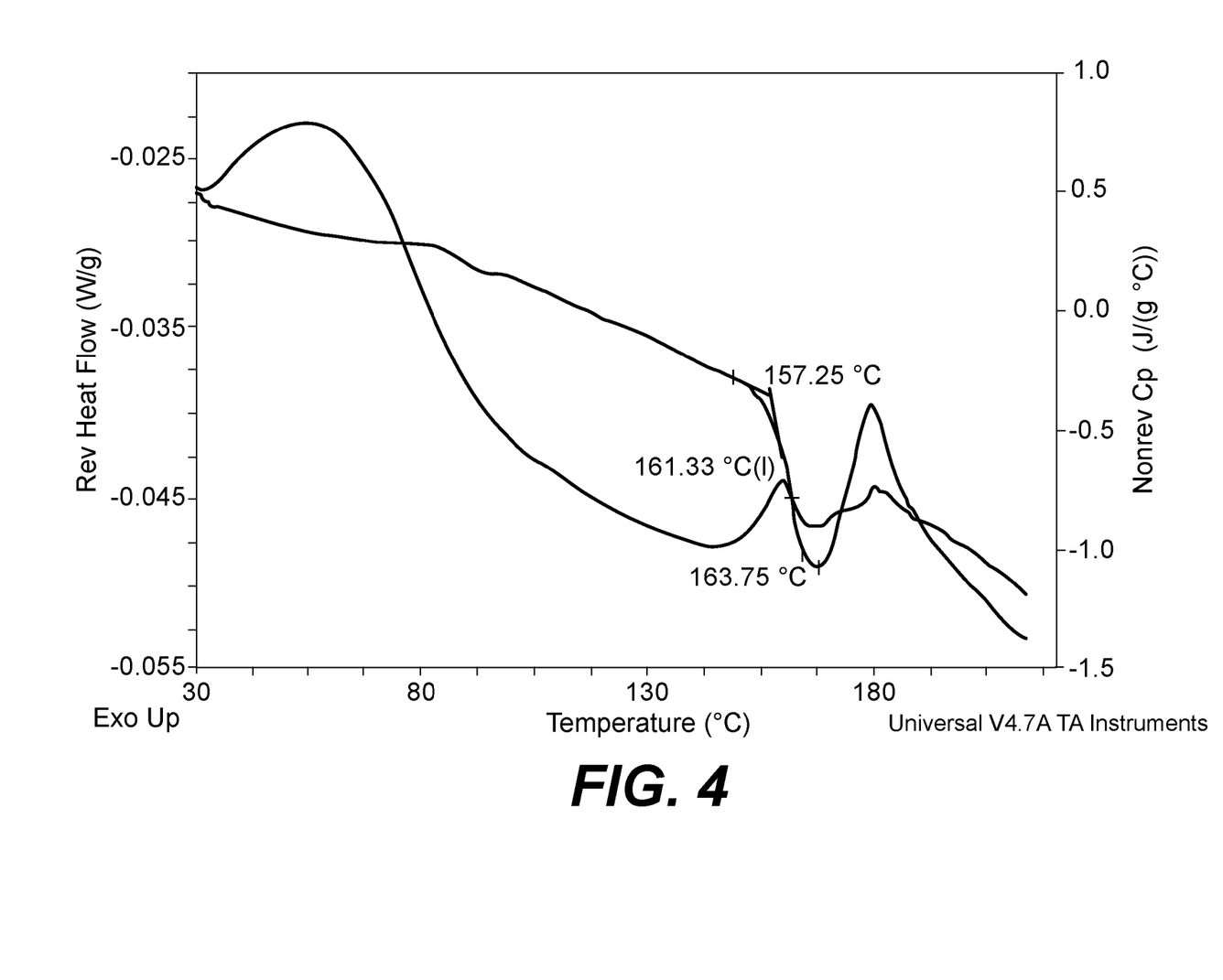
FIG. 4 is a modulated differential scanning calorimetry (DSC) thermogram of spray-dried amorphous form of Compound (I).
Figure 5:
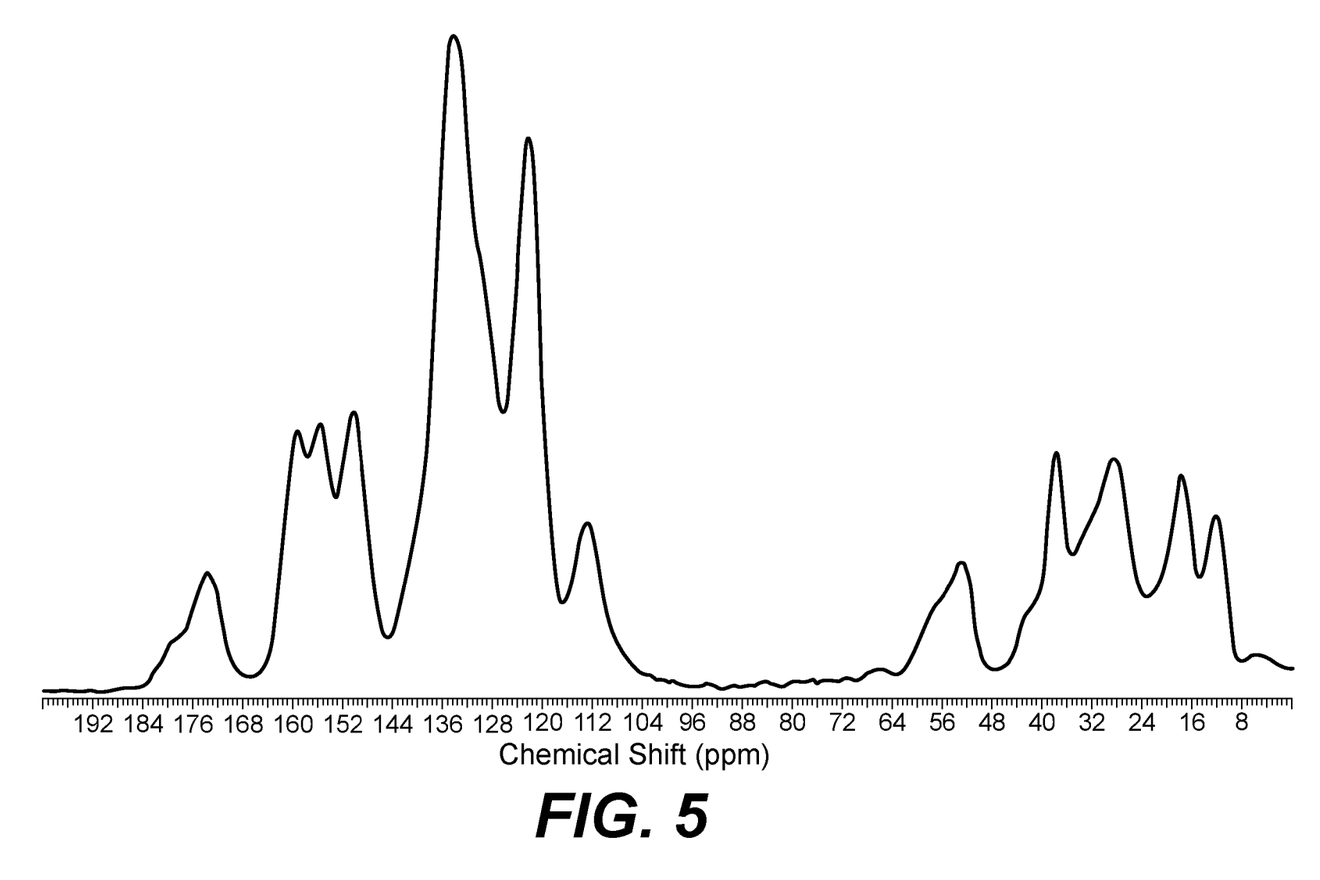
FIG. 5 shows the solid-state nuclear magnetic resonance spectra (ssNMR) of spray-dried amorphous form of Compound (I).

Powder X-ray diffraction pattern (FIG. 3) shows no observable crystalline peaks, thus indicating an amorphous solid. The spray-dried amorphous form of Compound (I) was also characterized by modulated differential scanning calorimetry (mDSC) and shown in FIG. 4. In addition, the $^{13}$C solid-state spectra, as shown in FIG. 5, for the spray-dried amorphous form was collected in accordance with the procedures described in General Procedure. The CPMAS chemical shift values of the form are given below:

| No. | ppm |
|---|---|
| 1 | 175 |
| 2 | 160 |
| 3 | 156 |
| 4 | 151 |
| 5 | 135 |
| 6 | 123 |
| 7 | 114 |
| 8 | 54 |
| 9 | 39 |
| 10 | 29 |
| 11 | 19 |
| 12 | 13 |

Example 3

Preparation of Amorphous Compound (I) Spray Dried Dispersion (SDD) with HPMCAS (75:25% (w/w) Ratio)

About 6% (w/w) Compound (I) and 2% (w/w) HPMCAS were dissolved in about 92% (w/w) of 9:1 acetone:water (w/w) mixture. The solution was warmed to 50° C., and then spray dried using a laboratory scale spray dryer with a 150-Kg/hr drying gas flow-rate capacity, set to the following parameters: gas flow rate: 1850 g/min; feed rate: 170 g/min; feed pressure: 400 psi; and inlet temp: 115° C. The Product was a white powder having a purity of 97% by HPLC. The PXRD diffraction pattern showed a halo pattern with no crystalline peaks (FIG. 6), indicating the product is amorphous.

The formulation exhibits good stability in moisture rich conditions. No crystallization was observed when samples of the spray-dried dispersion were exposed to high relative humidity, for instance the 75% drug load SDD stressed at different stability conditions for up to 12 months did not show signs of crystallinity by PXRD (Table 1).

TABLE 1

| PXRD Result for Stability Samples of 75% Compound (I): HPMCAS SDD | | |
|---|---|---|
| Condition | Time Point | PXRD Result |
| Initial | Initial | Amorphous/no crystalline peaks detected |
| −20° C. closed | 1-month | Amorphous/no crystalline peaks detected |
| 5° C. closed | 12-month | Amorphous/no crystalline peaks detected |
| 25° C./60% RH closed | 12-month | Amorphous/no crystalline peaks detected |
| 40° C./75% RH closed | 6-month | Amorphous/no crystalline peaks detected |

An in vitro dissolution test was performed to demonstrate that the solid amorphous dispersion of Example 3 is a solubility-improved form of Compound (I). Microcentrifuge dissolution tests were performed in a 37° C. temperature-controlled box. Weighed 1 mg of sample into each of two 2.0 mL Sorenson microcentrifuge tubes. Added 1.8 mL of 0.5% SIF in phosphate buffered saline (PBS) (pH 6.5) to each tube and started the timer. Vortexed the samples for 1 minute on Setting 8 on a Fisher Vortex Genie 2. Centrifuged the samples for 1 minute at 13,000 rpm using an IEC Micromax microcentrifuge. When the timer reads 4 minutes, extracted 50 µL of supernatant from each microcentrifuge tube into a HPLC vial containing 250 µL of diluent (HPLC-grade 95:5

THF:Water). Vortexed the mixtures for 25 seconds. Repeated the steps for following time points: 10, 20, 40, and 90 minutes, and again at 20 hours.

Analyzed the samples by HPLC using the method below:
Diluent 95:5 THF:Water
  Sample Injection Volume 5 μL
  Column Agilent Zorbax RX C18, 3.5 μm, 4.6×75 mm
  Flow Rate 1 mL/min
  Run Time 5 min
  Mobile Phase 55% 0.1% TFA in water 45% 0.1% TFA in Acetonitrile
  Temperature 30° C.
  Wavelength/Bandwidth Signal 220 nm/4 nm As a control, crystalline Compound (I) alone was evaluated using the same procedure. A sufficient amount of material was added so that the concentration of Compound (I) would have been 1000 μg/mL, if all of drug had dissolved.

The concentrations of Compound (I) obtained in these samples were used to determine the maximum dissolved concentration of Compound (I) in solution during the first ninety minutes of the test ($MDC_{90}$), the area under the concentration-versus-time curve during the initial ninety minutes ($AUC_{90}$). The results are shown in Table 2.

TABLE 2

Microcentrifuge Dissolution Test

| Formulation | Condition | $C_{max90}$ (μg/mL) | $AUC_{90}$ (μg/mL) |
|---|---|---|---|
| 75% SDD:HPMCAS (initial dosed at 1000 μg/mg) | Initial | 128 | 10710 |
| 75% SDD:HPMCAS (dosed 500 μg/mg) | 3 mo/5° C./closed | 117 | 9830 |
| 75% SDD:HPMCAS (dosed 500 μg/mg) | 3 mo/25° C./60% RH open | 113 | 9820 |
| 75% SDD:HPMCAS (dosed 500 μg/mg) | 3 mo/40° C./75% RH open | 114 | 9710 |
| 75% SDD:HPMCAS (dosed 500 μg/mg) | 3 mo/40° C./75% RH closed | 113 | 9790 |
| Crystalline API | | 26 | 1810 |

The dissolution behavior of the SDD was robust for all compositions and was not altered when exposed to stress conditions, for instance the 75% drug load SDD stressed at different stability conditions for 3 months did not show significant change in measured dissolution.

Example 4

Bioavailability of the SDD Formulation

In a formulation comparison study, three types of formulations were prepared: 1) 75% SDD suspension, i.e., Compound (I): HPMCAS 75:25 (w/w %); 2) 50% SDD suspension, i.e., Compound (I): HPMCAS 50:50 (w/w %); and 3) crystalline suspension of Compound (I). Four fasted or fed male dogs (~10 kg) were dosed 100 mg/dog. The dogs were fed with 50 mL water (fasted) or 50 mL high fat meal supplement (Boost plus Coffeemate) and eight blood samples were collected post-dosing.

Pharmacokinetic data are presented in Table 3. $C_{max}$ is the maximum observed plasma Compound (I) concentration, averaged over the number of dogs dosed with each formulation. $AUC_{0-24}$ is the average area under the plasma Compound (I) concentration vs. time curve.

These data demonstrate that spray-dried Compound (I)/HPMCAS dispersions, when orally dosed to beagle dogs, give a higher systemic Compound (I) exposure than after dosing an aqueous suspension of crystalline Compound (I).

TABLE 3

Bioavailability of the SDD Formulation

| Formulation | Dose (mg) | $C_{max}$ (ng/mL) | $AUC_{0-24}$ (ng · h/mL) |
|---|---|---|---|
| 75% SDD Suspension (fasted) | 100 | 4773.39 | 37855.00 |
| 50% SDD Suspension (fasted) | 100 | 5246.08 | 38194.65 |
| 75% SDD Suspension (fed) | 100 | 7350.13 | 62905.26 |
| Crystalline Suspension | 100 | 64.41 | 441.35 |

Example 5

Tablet Preparation

A tablet was prepared by compression with the components listed in Table 4. The spray dried 75% Compound (I):HPMCAS component and all intragranular excipients were passed through a screen, then blended in a mixer. This pre-blend was compressed into slugs, milled, and then passed through a screen. All extragranular excipients were passed through a screen, added to the milled granules, and then blended in a mixer. The final blend was then compressed into 25 mg and 100 mg strength tablets.

TABLE 4

SDD Tablet Preparation

| Component | % (w/w) | Amount per tablet (100 mg dose) |
|---|---|---|
| Intragranular | | |
| 75% Compound (I):HPMCAS | 26.66 | 133.3 |
| Microcrystalline cellulose | 33.54 | 167.7 |
| Lactose anhydrous DC | 33.54 | 167.7 |
| Croscarmellose sodium | 2.5 | 12.5 |
| Colloidal silicon dioxide | 0.50 | 2.50 |
| Magnesium stearate | 0.25 | 1.25 |
| Total Intragranular | 97 | 485 |
| Extragranular | | |
| Croscarmellose sodium | 2.5 | 12.5 |
| Magnesium stearate | 0.5 | 2.5 |
| Total | 100 | 500 |

Example 6

Stability Results of Compound (I) SDD Tablets—100 mg Dose

Furthermore, the tablet formulations were physically and chemically stable at different storage conditions. Exposing the sample to high humidity (40° C./75% RH) showed significant moisture gain (~3-4% w/w). This was confirmed by loss on drying experiment (Table 5). The moisture gain was mostly because of excipients in the formulation.

For initial time samples, with respect to the initial label claim, dissolution data (Table 6) indicated 90% drug release at around 30 minutes. Further, there was no impact of storage condition on the dissolution of the tablet formulations as a function of time.

The physical stability of the tablet was evaluated in various storage conditions. Tablets at 100 mg dose showed potency in the range of 99.6% to 100.9% across the storage conditions up to 4 weeks and hence were stable under all the tested stability conditions as a function of time (Table 5).

TABLE 5

SDD Tablet Stability Results

| Conditions | Week | Content Uniformity (%) | Potency (%) | PXRD |
|---|---|---|---|---|
| | Initial | 100.8 ± 0.3 | 100.8 | Amorphous |
| 5° C. Close | 2 | — | 100.0 | Amorphous |
| 25° C./60% RH Close | | | 100.7 | |
| 40° C./75% RH Close | | | 100.4 | |
| 40° C./75% RH Open | | | 99.9 | |
| 50° C. Close | | | 100.0 | |
| 5° C. Close | 4 | — | 100.4 | Amorphous |
| 25° C./60% RH Close | | | 100.6 | |
| 40° C./75% RH Close | | | 100.5 | |
| 40° C./75% RH Open | | | 100.9 | |
| 50° C. Close | | | 100.7 | |

Example 7

Capsule Preparation

A capsule was prepared by filling the components listed in Table 4 in a hard shell capsules. The spray dried 75% Compound (I):HPMCAS component and all intragranular and extragranular excipients were passed through a screen, then blended in a mixer. The final blend was then filled in hard shell capsules using capsule filling machine.

Example 8

Initial Characterization Results of Compound (I) SDD Capsules—100 mg Dose

For initial time samples, capsules at 100 mg dose showed 98.9% potency and with respect to the initial label claim, dissolution data indicated more than 90% drug release at around 30 minutes (Table 6). Initial water content was 2.6% w/w measured by loss on drying experiment.

TABLE 6

Dissolution Results of the SDD Capsule

| Dose | Content Uniformity (%) | Potency (%) | Dissolution (%) at 30 min (n = 6) | Water content (%) | PXRD |
|---|---|---|---|---|---|
| 100 mg—Initial | 97.5 ± 2.6 | 98.9 | 95.3 ± 2.2 | 2.6 | Amorphous |

Example 9

Bioavailability of a Solubilized Formulation in Dogs

A solution preparation suitable for direct administration or administration as a solution filled into a capsule has been shown to provide desirable exposure that is closely related to the SDD formulations described above (e.g., as suspension/tablet/capsule SDD dosage forms). Based on the solubility data, a complete aqueous-based formulation would not achieve the targeted concentration required to support clinical dosing. A co-solvent-based formulation of the API in an organic vehicle (e.g., Polyethylene glycol 400 or ethanol) in combination, either with complexing agent (e.g., cyclodextrin) or polymers (e.g., PVP, PVP-vinyl acetate copolymer, Poloxamer 188) or surfactant (e.g., TPGS, Tween 80). A particular embodiment of a solubilized solution formulation was prepared as 5 mg/ml concertation of Compound (I) in a vehicle of PEG400/TPGS/Water. A preclinical crossover study in dogs (n=4) demonstrated a high degree of exposure that was comparable to the SDD formulations and also greatly exceeded the exposure from a crystalline formulation (Example 4, table 3). Favorable pharmacokinetic result for these solution and SDD formulations (listed below), which were dosed at 25 mg (human equivalent dose of ~75 mg), are provided in Tables 7 and 8.

The treatment formulations are as follows:

SDD suspension (25 mg dose)—Pentagastrin, pre-treated, fasted dogs (n=4)

SDD Tablet (25 mg dose)—Pentagastrin pre-treated, fasted dogs (n=4)

Solubilized Solution (25 mg dose) for administration as solution or solution in capsule—Pentagastrin pre-treated, fasted dogs (n=4)

SDD capsule (25 mg dose)—Pentagastrin pre-treated, fasted dogs (n=4)

TABLE 7

Treatment Formulations

| Formulation | Dose (mg) | Composition |
|---|---|---|
| SDD Suspension | 25 | 1 mg/mL Compound (I) 75% SDD in water |
| SDD tablet | 25 | 20% drug load SDD 25 mg (Active basis)—granulation composition include MCC, lactose, lubricate, glidant, and disintegrate |
| Solubilized Solution | 25 | 5 mg/ml Compound (I) in 70/20/10 PEG400/TPGS/Water |
| SDD Capsule | 25 | The same SDD tablet granulation filled in a capsule |

TABLE 8

Observed Preclinical Pharmacokinetic Summary in Dogs

| Treatment | $C_{max}$ (ng/mL) Mean (CV %) | $AUC_{inf}$ (ng * h/L) Mean (CV %) |
|---|---|---|
| SDD suspension (treatment 1) | 1276 (10) | 8300 (24) |
| SDD tablet (treatment 2) | 823 (23) | 5505 (26) |
| Solubilized solution (treatment 3) | 1226 (23) | 7234 (40) |
| SDD capsule (treatment 4) | 1319 (32) | 8708 (32) |

While the invention has been described in detail and with reference to specific embodiments thereof, it will be apparent to one skilled in the art that various changes and modifications can be made therein without departing from the spirit and scope thereof

What is claimed is:

1. An amorphous solid dispersion comprising Compound (I):

(I)

and a polymer selected from the group consisting of providone (PVP), hydroxypropyl methyl cellulose acetate succinate (HPMCAS), and hydroxypropyl methylcellulose (HPMC).

2. The amorphous solid dispersion of claim 1 wherein the polymer is HPMCAS.

3. The amorphous solid dispersion of claim 1 wherein the ratio of Compound (I) to polymer is in the range of from about 99% to about 75% (w/w) Compound (I) and from about 1% to about 25% (w/w) polymer.

4. The amorphous solid dispersion of claim 1 wherein the ratio of Compound (I) to polymer is in the range of from about 74% to about 50% (w/w) Compound (I) and from about 26% to about 50% (w/w) polymer.

5. The amorphous solid dispersion of claim 1 wherein the ratio of Compound (I) to polymer is in the range of from about 49% to about 25% (w/w) Compound (I) and from about 51% to about 75% (w/w) polymer.

6. A pharmaceutical composition comprising a pharmaceutically acceptable carrier and a therapeutically effective amount of an amorphous solid dispersion comprising Compound (I):

(I)

and a polymer selected from the group consisting of providone (PVP), hydroxypropyl methyl cellulose acetate succinate (HPMCAS), and hydroxypropyl methylcellulose (HPMC).

7. The pharmaceutical composition of claim 6, wherein the pharmaceutical composition is in the form of a tablet.

8. The pharmaceutical composition of claim 6, wherein the pharmaceutical composition is in the form of a capsule.

9. The pharmaceutical composition of claim 6, wherein the pharmaceutical composition is in the form of a suspension.

10. The pharmaceutical composition of claim 7, wherein the tablet is storage stable for at least about 3 months.

11. The pharmaceutical composition of claim 8, wherein the capsule is storage stable for at least about 3 months.

12. The amorphous solid dispersion of claim 2, wherein the ratio of Compound (I) to polymer is about 75% (w/w) Compound (I) and about 25% (w/w) polymer.

13. The amorphous solid dispersion of claim 2, wherein the ratio of Compound (I) to polymer is about 50% (w/w) Compound (I) and about 50% (w/w) polymer.

14. The amorphous solid dispersion of claim 3, wherein the polymer is HPMCAS.

15. The amorphous solid dispersion of claim 4, wherein the polymer is HPMCAS.

16. The amorphous solid dispersion of claim 5, wherein the polymer is HPMCAS.

17. A pharmaceutical composition comprising a pharmaceutically acceptable carrier and a therapeutically effective amount of the amorphous solid dispersion of claim 2.

18. A pharmaceutical composition comprising a pharmaceutically acceptable carrier and a therapeutically effective amount of the amorphous solid dispersion of claim 12.

19. A pharmaceutical composition comprising a pharmaceutically acceptable carrier and a therapeutically effective amount of the amorphous solid dispersion of claim 13.

20. The pharmaceutical composition of claim 10, wherein the amorphous solid dispersion is stable for at least about 12 months.

21. The pharmaceutical composition of claim 11, wherein the amorphous solid dispersion is stable for at least about 12 months.

* * * * *